United States Patent
Yamazaki et al.

(10) Patent No.: US 7,327,918 B2
(45) Date of Patent: Feb. 5, 2008

(54) WAVEGUIDE-TYPE OPTICAL SPLITTER AND WAVEGUIDE-TYPE OPTICAL MODULE HAVING THE SAME

(75) Inventors: Hiroyuki Yamazaki, Tokyo (JP); Takaaki Hatanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/068,892

(22) Filed: Mar. 2, 2005

(65) Prior Publication Data
US 2005/0196102 A1 Sep. 8, 2005

(30) Foreign Application Priority Data
Mar. 5, 2004 (JP) ............................. 2004-062927
Jan. 11, 2005 (JP) ............................. 2005-003461

(51) Int. Cl.
*G02B 6/26* (2006.01)

(52) U.S. Cl. .............................. 385/48; 385/43; 385/39

(58) Field of Classification Search ................. 385/14, 385/24, 28, 37, 43, 49, 132, 48, 27, 31, 39
See application file for complete search history.

(56) References Cited

U.S. PATENT DOCUMENTS

| | | | |
|---|---|---|---|
| 6,195,481 B1 | 2/2001 | Nakajima et al. | 385/24 |
| 6,580,862 B2 * | 6/2003 | Kominato et al. | 385/131 |
| 6,778,737 B2 * | 8/2004 | Shimoda | 385/43 |
| 6,788,850 B2 * | 9/2004 | Albrecht et al. | 385/37 |
| 6,798,952 B2 | 9/2004 | Naruse | 385/37 |
| 6,937,797 B2 * | 8/2005 | Mizuno et al. | 385/43 |
| 7,020,367 B2 * | 3/2006 | Suzuki et al. | 385/43 |
| 7,079,727 B1 * | 7/2006 | Little | 385/28 |
| 7,082,231 B2 * | 7/2006 | Joyner et al. | 385/14 |
| 2003/0053756 A1 * | 3/2003 | Lam et al. | 385/49 |

FOREIGN PATENT DOCUMENTS

| | | |
|---|---|---|
| EP | 1 128 193 A1 | 8/2001 |
| JP | 2538099 B2 | 2/1992 |
| JP | 2001-042146 | 2/2001 |
| JP | 2003-172830 | 6/2003 |
| WO | WO 00/11508 A1 | 3/2000 |

* cited by examiner

*Primary Examiner*—Kevin S. Wood
(74) *Attorney, Agent, or Firm*—Foley & Lardner LLP

(57) ABSTRACT

To solve the wavelength dependence of loss uniformity between waveguides for output. A waveguide for input for introducing an optical signal, a slab waveguide for branching off the optical signal introduced in the waveguide for input by diffraction and propagating, and a plurality of waveguides for output for outputting individually a plurality of optical signals which are branched off inside of the slab waveguide are provided. The waveguide for input is configured such that an output end thereof is connected to an incident end of the slab waveguide and has a function for converting a spot size of the optical signal on the incident end of the slab waveguide at a connection point with the slab waveguide.

13 Claims, 8 Drawing Sheets

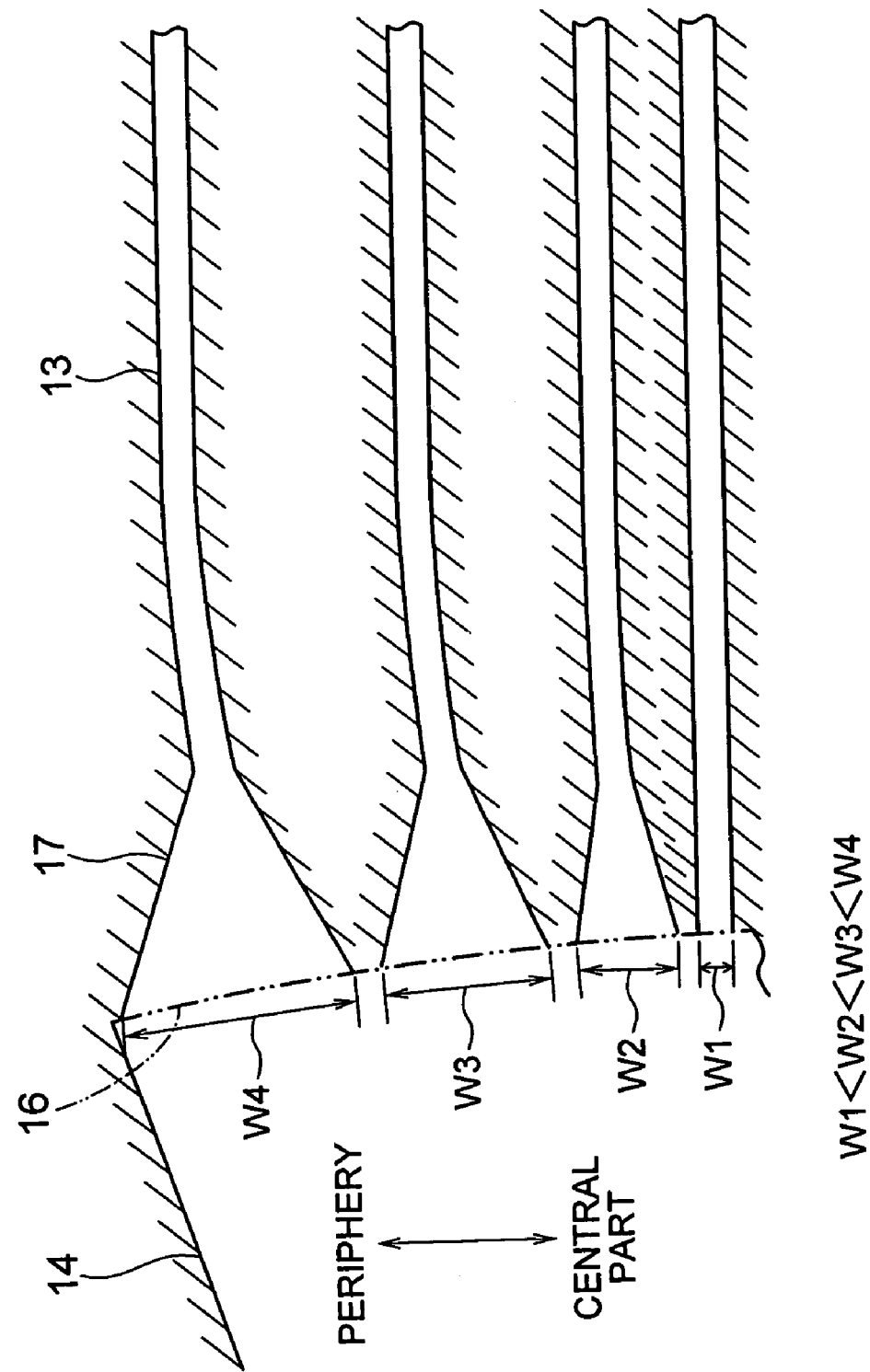

WAVEGUIDE-TYPE OPTICAL SPLITTER AND WAVEGUIDE-TYPE OPTICAL MODULE HAVING THE SAME

BACKGROUND OF THE INVENTION

1. Field of the Invention

The present invention relates to a waveguide-type optical splitter and a waveguide-type optical module having the same which are used in such as a PON (Passive Optical Network) system in order to branch off light into plural.

2. Description of the Related Art

Applications to subscribers of the PON system have been active for establishing optical communication systems at low cost. The PON system indicates the efficient use to be possible by branching off an optical fiber with an optical splitter in access sections, thus remarkable cost reduction is realized.

In this PON system, an optical splitter module is used in branching off of light. As this optical splitter module, required are a low insertion loss, low polarization dependence and high reliability. A PLC (Planar Lightwave Circuit) type optical splitter satisfies these needs and has been produced several tens of thousands per month only in Japan as a key device of the PON system.

In the PLC type optical splitter, while it has characteristics as compact and high reliability, double refraction is generated due to the difference in a linear expansion coefficient between a Si substrate and $SiO_2$ thereby causing an adverse influence on optical characteristics. When a Y-branch is formed in a waveguide where the double refraction is generated, a branch ratio has a feature of polarization dependence thereby causing branched light to generate a PDL (Polarization Dependent Loss) which has a dependence on polarization. The PDL has an effect on the power margins of the optical communication systems, consequently, it is necessary to reduce of the same.

With regard to this PLC type optical splitter (a first conventional example), description will be provided in detail with reference to FIG. 1.

A PLC type optical splitter 80 is a configuration of 1×8 in which a waveguide 82 is formed on a substrate 81. An incident end 83 of the substrate 81 is connected to an optical fiber for input 84 and an output end 85 of the substrate 81 is connected to optical fibers for output 86. Then, the waveguide 82 is branched off into a plurality of waveguides by a Y-branched structure of a multi-stage. The plurality of waveguides which are branched off are connected to the optical fibers for output 86 respectively.

However, when the Y-branched structure of the multi-stage is applied to the PLC type optical splitter 80 in which the double refraction is large, the PDL cumulatively increases according to the number of the branch, therefore it may not meet the needs from customers. Particularly, even though it may not cause any problem in the current configurations of 1×4 and 1×8, the cumulated PDL cannot be neglected in multiple branch structures such as the one of 1×32. Further, an insertion loss will be increased by the occurrence of a branch excess loss at the Y branch in the PLC type optical splitter 80 with multiple branches.

In order to overcome the aforementioned problems of the PLC type optical splitter 80 and to realize favorable optical characteristics, employing so-called a "star coupler" which obtains multiple branches at single will be desired. However, in the conventional star couplers, despite optical power is large in a waveguide for output at the center, it becomes small in a waveguide for output at the end. Accordingly, the conventional star couplers have weakness in that loss uniformity in each port after being branched off is inferior to the one in the Y-branched type while the favorable polarization dependence can be obtained in the waveguide where the double refraction is large. The Patent Document 1 discloses a star coupler intended to solve such problems.

The star coupler of this Patent Document 1 (a second conventional example) will be described in detail with reference to FIG. 2.

A star coupler 90 is so configured such that a waveguide for input 92, a sector slab waveguide 93, a plurality of tapered waveguides 94 and a plurality of waveguides for output 95 are sequentially arranged and connected on a silicon substrate 91. In the star coupler 90, the tapered waveguides 94 are respectively disposed in all of the waveguides for output 95. Also, by setting the opening width of the sector slab waveguide 93 side for each tapered waveguide 94 as narrow in the center with large light intensity and, on the contrary, as wide in the vicinity with small light intensity, all the intensity of signal lights which are branched off into the waveguides for output 95 are intended to be consistent (that is, the loss is to be uniformed).

Patent Document 1: Japanese Patent 2,538,099

Meanwhile, in the star coupler 90, an angle of diffraction of light propagating in the sector slab waveguide 93 has the dependence of wavelength. Consequently, for example, the loss uniformity between the waveguides for output 95 is to be altered in the wavelengths of 1.55 µm and 1.3 µm because the angles of diffraction are different. Hence, in the waveguides for output 95 in the vicinity, even though the light intensity is sufficient in some wavelengths, it is insufficient in other wavelengths. In this manner, the result is that the optical characteristics have dependence on the wavelengths.

SUMMARY OF THE INVENTION

The object of the present invention is to solve the wavelength dependence of loss uniformity between waveguides for output and to provide a waveguide-type optical splitter and a waveguide-type optical module which is superior in the optical characteristics.

To achieve the above-mentioned object, the waveguide-type optical splitter according to the present invention includes: a waveguide for input for introducing an optical signal; a slab waveguide for branching off the optical signal introduced in the waveguide for input by diffraction and propagating; and a plurality of waveguides for output for outputting individually a plurality of optical signals branched off inside of the slab waveguide, wherein the waveguide for input is configured such that an output end thereof is connected to an incident end of the slab waveguide and has a function for converting a spot size of the optical signal on the incident end of the slab waveguide at a connection point with the slab waveguide.

The optical signal which has reached the incident end of the slab waveguide from the waveguide for input is branched off into plural by diffraction inside of the slab waveguide. At this time, the angle of diffraction in the optical signal has wavelength dependence, causing the wavelength dependence to occur the loss uniformity between the wavelengths for output.

Accordingly, with respect to the spot size in the input end of the slab waveguide, the present inventor has obtained the following experimental results: as the spot size is larger, the angle of diffraction becomes smaller; and also as the wavelength of the optical light is longer, the spot size becomes larger. In accordance with the above, the present invention has been established. Specific explanations will be given.

The waveguide for input is needed to have a width in which an optical signal propagating therethrough does not leak to outside. When the optical signal is introduced from this waveguide for input to a slab waveguide, making the spot size of the slab waveguide in the incident end larger has been impossible.

Consequently, in accordance with the inventor of this invention, an output end of the waveguide for input is connected to the incident end of the slab waveguide so that a function for converting the spot size of the optical signal on the incident end of the slab waveguide is provided at a connection point with the slab waveguide of the waveguide for input.

The function for converting the spot size is realized, for example, by making the connection point of the waveguide for input narrowed. Because the connection point of the waveguide for input is narrowed, the narrowed width of the waveguide for input becomes narrower than the width which is needed in order not to leak the optical signal to outside. Hence, indicated is that a part of the optical signal leaks from the connection point of the waveguide for input to outside. The waveguide for input is connected to a slab waveguide, therefore, the place where the optical signal leaks from the waveguide for input approaches an incident end of the slab waveguide. Besides, a leaked optical signal disperses on the periphery of the connection point with the waveguide for input and the slab waveguide and is incident upon the incident end of the slab waveguide. Because of this, the spot size of the optical signal on the incident end of the slab waveguide is enlarged on the periphery of the connection point with the waveguide for input and the slab waveguide.

As described above, according to this invention, the spot size in the input end of the slab waveguide is enlarged and the angle of diffraction of the optical signal inside the slab waveguide is to be small thereby enabling the angle of diffraction to be uniform regardless of a wavelength of the optical signal. Because of this, as the wavelength of the optical signal is longer, the angle of diffraction can be small by enlarging the spot size, and thus the wavelength dependence of loss uniformity between the waveguides for output can be improved very much.

BRIEF DESCRIPTION OF THE DRAWINGS

FIG. 4 is a partial enlarged view of the FIG. 3;

DETAILED DESCRIPTION OF THE PREFERRED EMBODIMENTS

Figure 1:
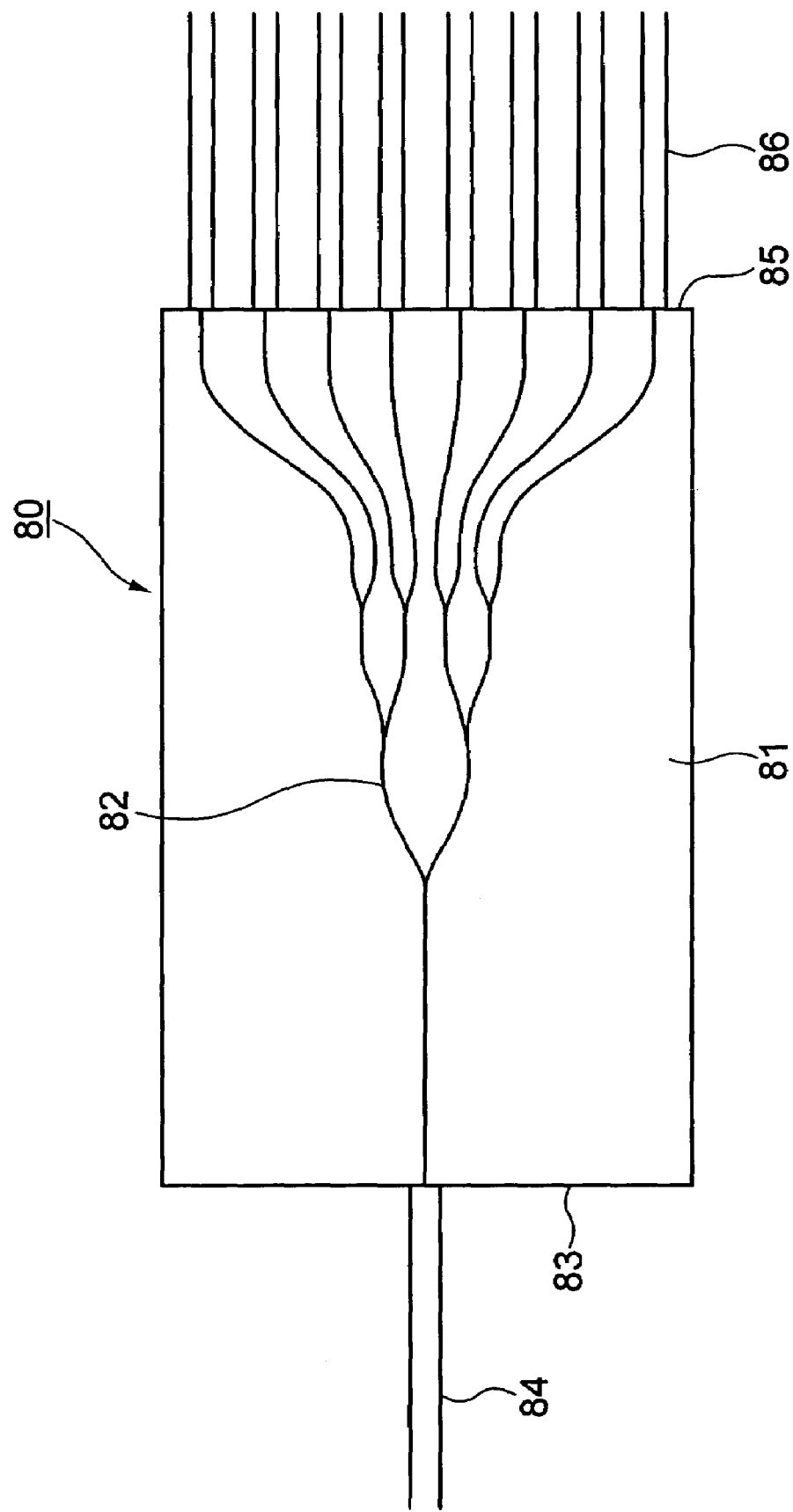
FIG. 1 is a plan view showing a first conventional example.
Figure 2:
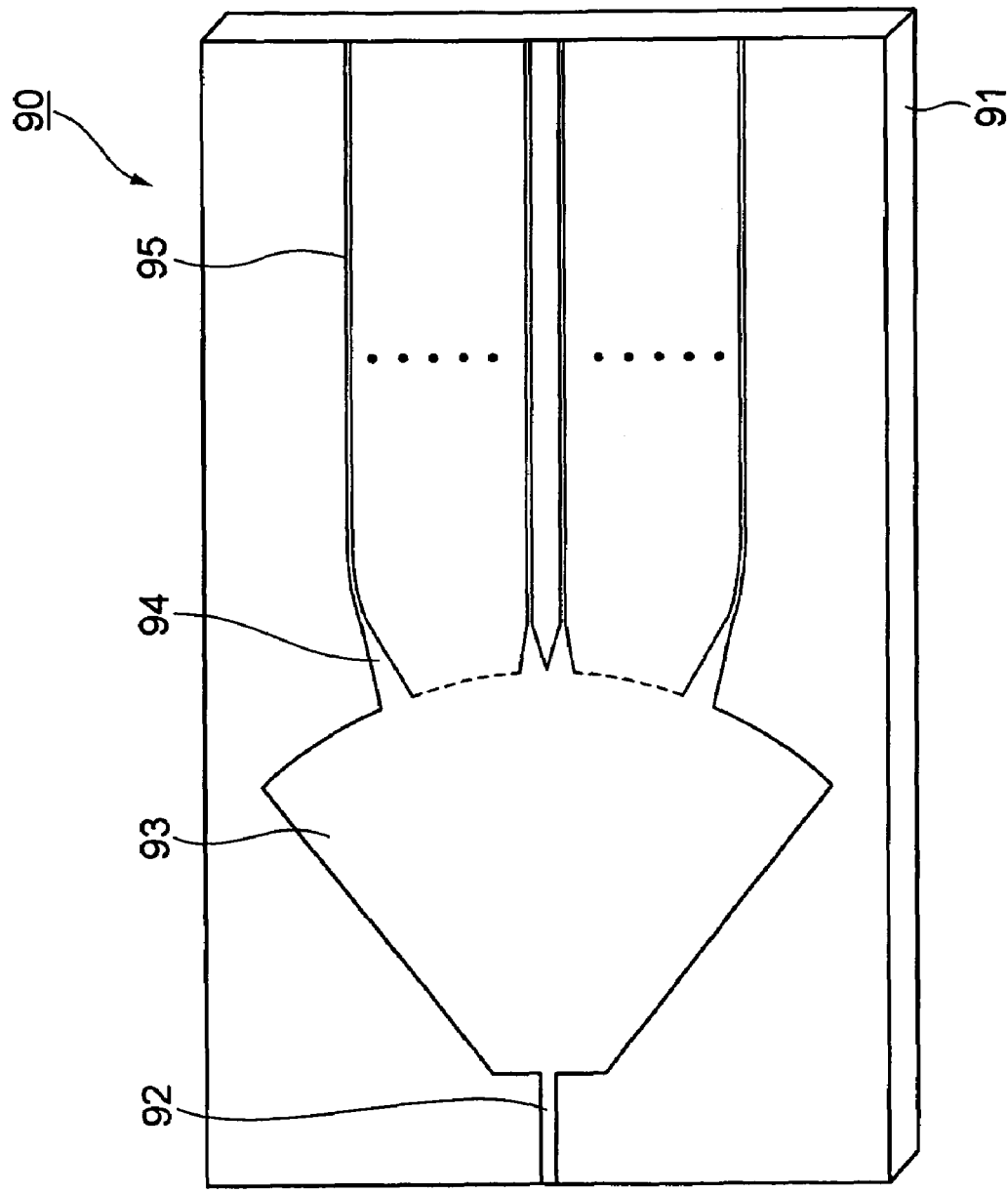
FIG. 2 is a plan view showing a second conventional example.
Figure 3:
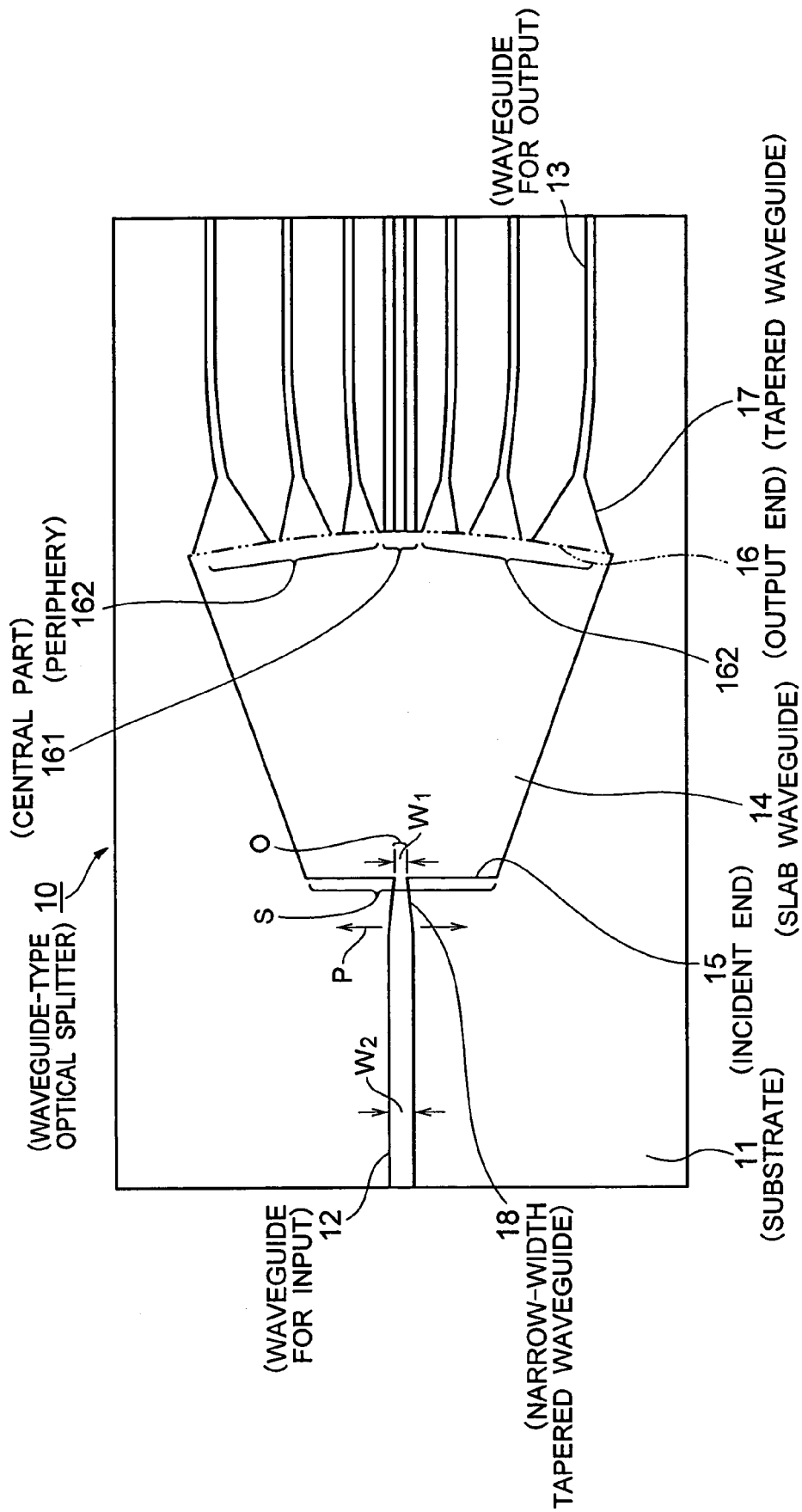
FIG. 3 is a plan view showing a first embodiment of the present invention.

FIG. 3 is a plan view which shows a first embodiment of a waveguide-type optical splitter according to the present invention. FIG. 4 is a partial enlarged view of the FIG. 3. Descriptions are provided below with reference to the FIG. 3 and the FIG. 4.

In a waveguide-type optical splitter 10 of this embodiment, a waveguide for input 12, a plurality of waveguides for output 13 and a slab waveguide 14 are formed on a substrate 11. The waveguide for input 12 is so configured as to introduce an optical signal. The slab waveguide 14 is so configured as to cause the optical signal introduced in the waveguide for input 12 to branch off by diffraction and to propagate. The plurality of waveguides for output 13 are so configured as to output individually a plurality of optical signals which have been branched off inside the slab waveguide 14. The slab waveguide 14 has an incident end 15 and an output end 16. In the slab waveguide 14, the output end 16 is formed in a shape of an arc in the incident end 15 or its vicinity. The waveguide for input 12 is connected to the incident end 15 of the slab waveguide 14. The plurality of waveguides for output 13 are connected to the output end 16 of the slab waveguide 14 in parallel.

In the waveguide-type optical splitter 10 according to this embodiment, provided are a function for converting the spot size of an optical signal on the incident end 15 of the slab waveguide 14 at a connection point with the waveguide for input 12 and the slab waveguide 14. In this embodiment, with the function for converting the spot size, a spot size S of the optical signal on the incident end 15 of the slab waveguide 14 are enlarged, as indicated by the arrows, from a center O, which is the connection point with the waveguide for input 12 and the slab waveguide 14, toward a periphery P. In this case, it is possible to have a conversion function of the spot size S by making the connection point with the waveguide for input 12 narrowed. The connection point of the waveguide for input may be narrowed in a tapered shape or in a curved shape.

The waveguide for input 12 of the embodiment shown in FIG. 3 and FIG. 4 includes, at the connection point with the slab waveguide 14, a unit waveguide 18 for converting the spot size S of the optical signal on the incident end 15 of the slab waveguide 14. The unit waveguide 18 is narrowed in a tapered shape and connected to the slab waveguide 14 and then an opening area of the connection end portion is reduced. When the opening area of waveguide for input 12, which is required to transmit an optical signal without loss, is to be W2 and the reduced opening area of the unit waveguide 18 is to be W1, the relationship W1<W2 is established. Here, the opening area is represented in the case the waveguides 12 and 18 are sectioned in a direction perpendicular to a lengthwise direction.

Consequently, because the taper-shaped unit waveguide 18 executes a conversion function of the spot size S, the spot size S of the optical signal on the incident end 15 of the slave waveguide 14 is enlarged, as indicated by the arrows, from the center O, which is the connection point with the waveguide for input 12 and the slab waveguide 14, toward the periphery P.

The light intensity which has reached from the incident end 15 to the output end 16 becomes lower as traveling from the center of the output end 16 to the periphery.

Because the spot size S on the incident end 15 of the slab waveguide 14 is enlarged from the center O to the periphery P, the angle of diffraction in the optical signal becomes lower when the optical signal propagates inside the slab waveguide 14. Thereby, minimizing the lowering of the light intensity in the periphery P toward the light intensity in the center O of the slab waveguide 14 is possible. Several waveguides for output 13 which are arranged in a central part 161 of the slab waveguide 14 are directly connected to the output end 16 of the slab waveguide 14. Also, the waveguides for output 13 arranged from the central part 161 of the slab waveguide 14 to a periphery 162 are connected to the output end 16 of the slab waveguide 14 through tapered waveguides 17. As indicated in the FIG. 4, the tapered waveguide 17 is formed in a reverse-tapered shape in which an opening area is reduced with distance from the slab waveguide 14. When the opening area of the tapered waveguide 17 in the center O is to be W1 and the ones of the tapered waveguides 17 arranged in parallel to the periphery 162 are to be W2, W3 and W4, the relationship W1<W2<W3<W4 is set up.

Other than a silicon substrate, a substrate may be a glass substrate, an LN ($LiNbO_3$) substrate or semiconductor substrates such as InP and GaAs. On this substrate 11, a core layer being the waveguides 12, 13 and 14 and a clad layer other than the waveguides are formed with micromachining technology such as CVD, photolithography and RIE. Other than a silica waveguide, for instance, the waveguides 12, 13 and 14 may be an InGaAsP substrate, a GaAs substrate, a diffusion waveguide diffused Ti or the like to such as an LN substrate, a polymer waveguide and an ion-exchange waveguide. In addition, the output end 16 of the slab waveguide 14 is formed in the shape of an arc. This arc shape is not limited to the case when a radius of curvature is uniform and may be a form which is adjusted to be able to vary the radius of curvature little by little. Moreover, the waveguide-type optical splitter according to the present invention can be used at a connection point with a waveguide for input of an AWG (array waveguide grating) device and a slab waveguide.

Also, the waveguide for input 12 and the waveguide for output 13 are connected to, not shown, an optical fiber for input and an optical fiber for output respectively. After propagating the waveguide for input 12, a signal light from an optical fiber travels with spreading because there is no trap of a horizontal direction in the slab waveguide 14. Here, the width of the slab waveguide 14 (opening area) is large enough to the extent light spread by diffraction does not impinge upon a border. Besides, it is known that a center of curvature in a wave surface of light which is spread by diffraction from the incident end 15 is placed in the back deeper than the incident end 15. Therefore, the center of curvature of the slab waveguide 14 is arranged in the side of the waveguide for input 12 by approximately a few µm to several tens of µm compared with the incident end 15. The positions and forms of each tapered waveguide 17 (opening widths at the side of the output end 16) are set to be a predetermined branch ratio. Also, the cone angle of the tapered waveguide 17 is to be low to the extent possible thereby suppressing the radiation loss of light caused by reduction of the width in the waveguide. Meanwhile, with respect to the waveguides for output 13, the case when there are eight is illustrated; however, any of the number is, needless to say, acceptable.

Light which has reached the incident end 15 of the slab waveguide 14 from the waveguide for input 12 propagates inside of the slab waveguide 14, spreading in the form of the sector by diffraction, and then travels further from the output end 16 of the slab waveguide 14, branching off into the plurality of waveguides for output 13. At this time, as the light in which the wavelength is longer, the angle of diffraction is larger, whereby the wavelength dependence is occurred in the loss uniformity between the wavelengths for output 13.

Therefore, in the present invention, the output end of the waveguide for input 12 is connected to the incident end 15 of the slab waveguide 14 so as to provide a function for converting the spot size S of the optical signal on the incident end 15 of the slab waveguide 14 at the connection point with the slab waveguide 14 of the waveguide for input 12. Because the unit waveguide 18 of the waveguide for input 12 is narrowed, the narrowed width of the unit waveguide 18 (opening area) W1 becomes narrower than the width (opening area) W2 which is needed not to leak the optical signal to outside. Therefore, indicated is that a part of the optical signal leaks, toward the periphery, from the unit waveguide 18 of the waveguide for input 12 to outside. Because the waveguide for input 12 is connected to the slab waveguide 14, the part where the optical signal leaks from the unit waveguide 18 approaches to the incident end 15 of the slab waveguide 14. Besides, the leaked optical signal disperses on the periphery of the connection point with the waveguide for input 12 and the slab waveguide 14 and is incident upon the incident end 15 of the slab waveguide 14. Because of this, the spot size S of the optical signal on the incident end 15 of the slab waveguide 14 is enlarged on the periphery of the connection point with the unit waveguide 18 of the waveguide for input 12 and the slab waveguide 14.

As aforementioned, with regard to the spot size in the input end 15 of the slab waveguide 14, the present embodiment is focused on that as the spot size is longer, the angle of diffraction becomes smaller and as the width of the waveguide for input 12 in the input end 15 of the slab waveguide 14 is narrower and as the wavelength is longer, the spot size becomes larger. Accordingly, by making the connection point with the waveguide for input 12 and the input end 15 of the slab waveguide 14 be narrower than the waveguide for input 12, the present embodiment is configured such that the spot size becomes large to the extent the wavelength is long. That is, the spot size is made large by providing a narrow-width tapered waveguide 18. Consequently, the following cause-and-effect relations are established: the angle of diffraction becomes large to the extent a wavelength is long→the narrow-width tapered waveguide 18 is arranged the spot size becomes large to the extent the wavelength is long→the decreased amount of the angle of diffraction increases to the extent the wavelength is long→the angle of diffraction is uniform regardless of the wavelength. Specifically, the spot size is converted by being the opening width of the narrow-width tapered waveguide 18 as approximately 4 µm when being the width of the waveguide for input 12 of the ordinal part as 7 µm. From this, the wavelength dependence of loss uniformity between waveguides for output 13 can be improved whereby the waveguide-type optical splitter 10 superior in optical characteristics can be realized.

The light incident upon the slab waveguide 14 from the waveguide for input 12 spreads into the input end 15 or its vicinity in the form of the sector by a diffraction phenomenon and then reaches the output end 16 formed in the shape of the arc. The light intensity which has reached the output end 16 indicates the Gaussian distribution which becomes low as traveling toward its periphery from the center of the output end 16. Then, the light which has reached the output end 16 travels into the waveguides for output 13 at the central part 161 of the output end 16 and travels into the waveguides for output 13 at the peripheral part 162 of the output end 16 through the tapered waveguide 17. Hereby, because the waveguides for output 13 of the central part 161 where the light intensity is high do not have the tapered waveguide 17, the light is not collected more than necessary. Also, in the waveguides for output 13 of the periphery 162 where the light intensity is low, there is the tapered waveguide 17, accordingly, by collecting the sufficient light, the loss uniformity between the wavelengths for output 13 is achieved. Additionally, the opening width of the tapered waveguide 17 becomes wider with distance to its periphery. That is, the opening widths W1 to W4 correspond to the Gaussian distribution of the light intensity in the output end 16 thereby loss uniformization between the waveguides for output 13 is achieved more.

In this embodiment, the tapered waveguide 17 is not provided in the central part 161 of the output end 16, consequently, the loss uniformization between the waveguides for output 13 can be realized even if the opening width of the tapered waveguide 17 provided in the peripheral part 162 of the output end 16 is made narrower than the one of the conventional technique. Hence, it is possible to be a higher density in the waveguides for output 13 and to be uniform in loss therebetween.

FIG. 5 shows the embodiment illustrating a configuration that the conversion function of the spot size is provided at the connection point with the slab waveguide 14 of the waveguide for input 12. The waveguide for input 12 of this embodiment includes, at the connection point, the unit waveguide 18 which executes the conversion function of the spot size. The configuration of the unit waveguide 18 is described.

Figure 5A:
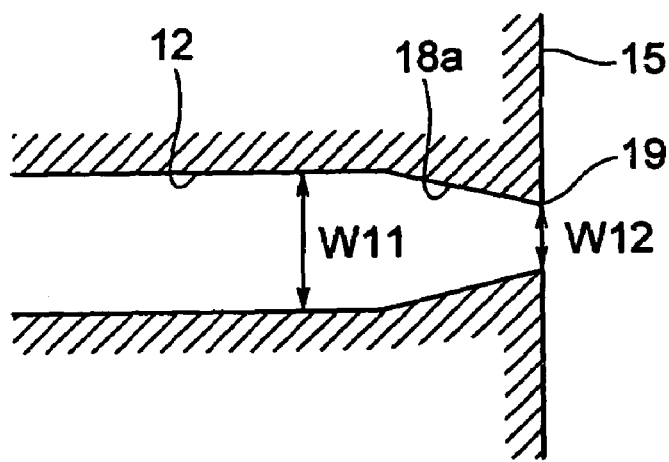
FIG. 5 is a partial enlarged plan view showing a second embodiment of a waveguide-type optical splitter to which the present invention pertains, illustrating a first example in FIG. 5(A), a second example in FIG. 5(B), and a third example in FIG. 5(C)

In a unit waveguide 18*a* illustrated in FIG. 5(A), a width (opening area) is narrowed in a tapered shape. When the width (opening area) of the waveguide for input 12 required not to leak the optical signal to outside is to be W11 and a width (opening area) 19 of the unit waveguide 18*a* at the position narrowed and connected with the incident end 15 of the slab waveguide 14 is to be W12, it is set up as W12<W11. Here, it is preferable that the opening width W12 of the unit waveguide 18*a* be 90 percent or less and 10 percent or more to the width W11 of the waveguide for input 12. For instance, if the W11 is 6 μm, the W12 is 0.6 μm to 5.4 μm. The rational of the upper limited value is because the effect is inadequate with 90 percent or more. The rational of the lower limited value is because suddenly the light cannot easily propagate the waveguide for input 12 with less than 10 percent thereby the loss increases. With regard to other unit waveguides 18*b* and 18*c*, they are also the same.

Figure 5B:
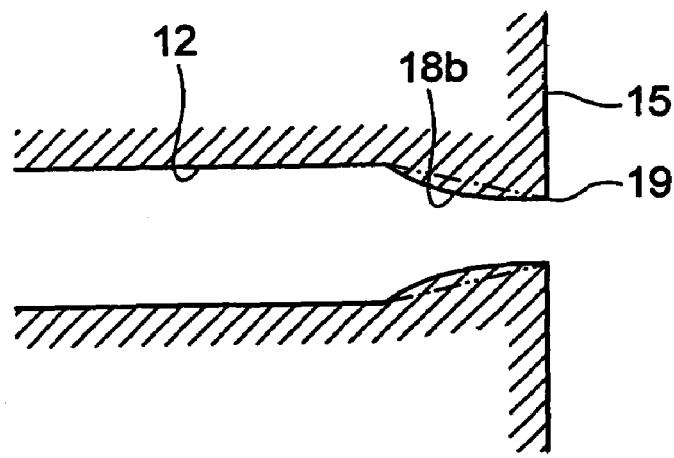
Figure 5C:
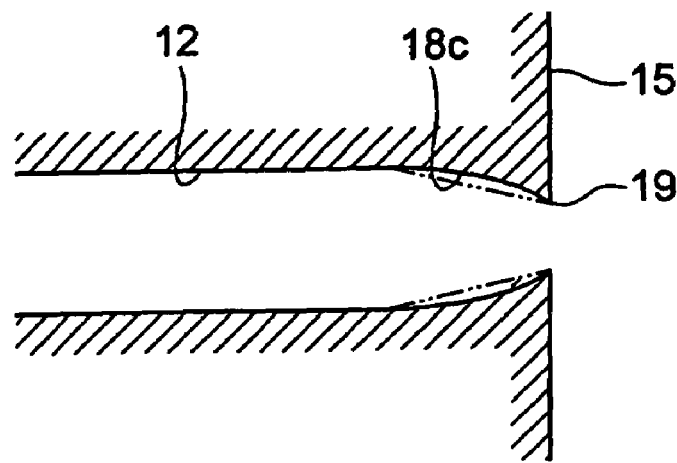

Unit waveguide 18*b* and 18*c* which are shown in FIG. 5(B) and FIG. 5(C) illustrate an example reduced in a curved shape. Specifically speaking, in the unit waveguide 18*b* shown in FIG. 5(B), by gradually overhanging a wall, which partitions a waveguide, inwardly in a convex shape, the opening area of the waveguide is reduced in the curved shape. The unit waveguide 18*c* shown in FIG. 5(C) is a reverse case of the FIG. 5(B) in terms of the shape of a curve and is configured such that the wall which partitions the waveguide is gradually shifted outwardly in the convex shape and the opening area of the waveguide is narrowed in the curved shape. The curves which are narrowed in the unit waveguides 18*b* and 18*c* may be represented, for example, by an n function (n is an integer equal to or greater than two), an exponential function and a power series. As shown in the FIG. 5(B) and the FIG. 5(C), if the unit waveguides 18*b* and 18*c* are narrowed in the curved shape, the transmission loss when the optical signal is propagated inside the unit waveguides 18*b* and 18*c* can be minimized, thus, the intensity of the optical signal transmitted from the unit waveguides 18*b* and 18*c* to the central part O of the incident end 15 in the slab waveguide 14 is not lowered.

Figure 6A:
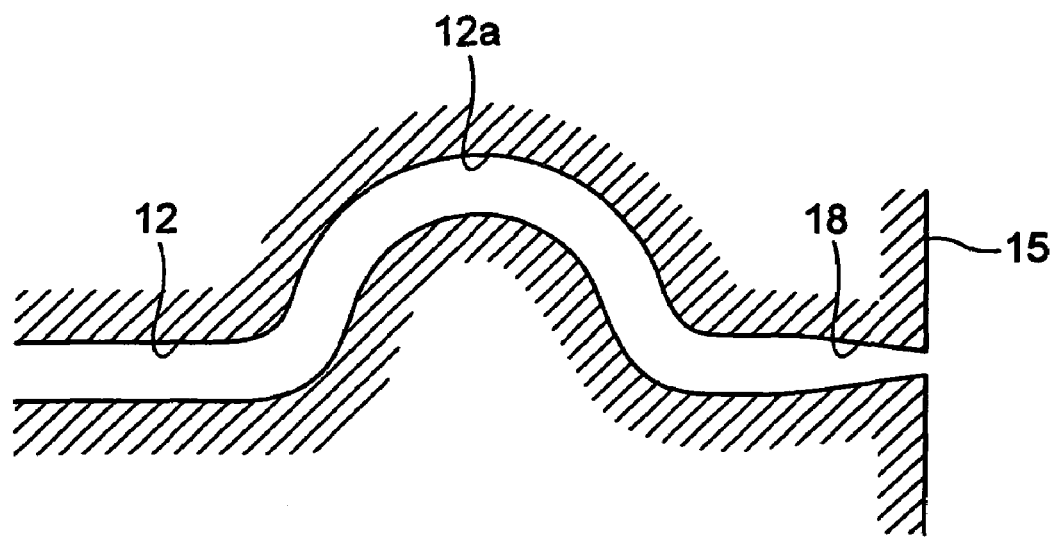
FIG. 6 is a partial enlarged plan view showing a third embodiment of a waveguide-type optical splitter to which the present invention pertains, illustrating a first example in FIG. 6(A) and a second example in FIG. 6(B)
Figure 6B:
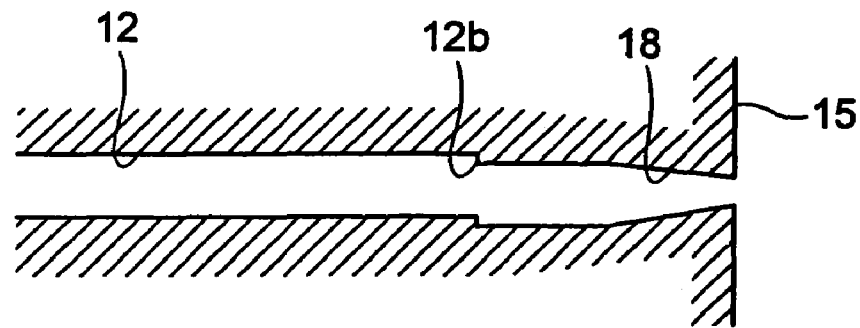

FIG. 6(A) and FIG. 6(B) show the embodiment illustrating a configuration of the waveguide for input 12. If a higher mode is included in a fundamental mode of the optical signal when the optical signal is transmitted in the waveguide for input 12, the transmission loss increases. Consequently, in this embodiment, the waveguide for input 12 has a transmission loss function for losing the optical signal of the higher mode which is included in the fundamental mode.

The waveguide for input 12 shown in FIG. 6(A) is provided with a curved waveguide 12*a* in which a part of the front stage of the unit waveguide 18 is serpentine in the curved shape. The transmission loss function of the optical signal with the higher mode is executed by this curved waveguide 12*a*. It can be considered that the reason why the operation becomes unstable in the waveguide for input 12 is because the higher mode is included in the fundamental mode. Since the loss when the curved waveguide 12*a* is propagated is more significant in the higher mode than in the fundamental mode, by using this actively, the higher mode is removed and only the fundamental mode can be extracted. The shape of the curved waveguide 12*a* is represented as an arc in which a radius of curvature is constant, however, a curved shape such as a sinusoidal wave function may be possible too.

The waveguide for input 12 shown in FIG. 6(B) is provided with a discontinuous waveguide 12*b* in which an optical axis of the waveguide in a part of the front stage of the unit waveguide 18 is displaced. The transmission loss function of the optical signal with the higher mode is executed by this discontinuous waveguide 12*b*. The shift of the optical axis of this discontinuous waveguide 12*b* is, for example, approximately from 0.1 μm to 1 μm and it is displaced in a direction orthogonal to the optical axis of the waveguide. In this embodiment also, because the loss when the optical signal of the higher mode propagates the discontinuous waveguide 12*b* is more significant, by using this actively, the optical signal of the higher mode is removed and only the one of the fundamental mode can be extracted.

Figure 7:
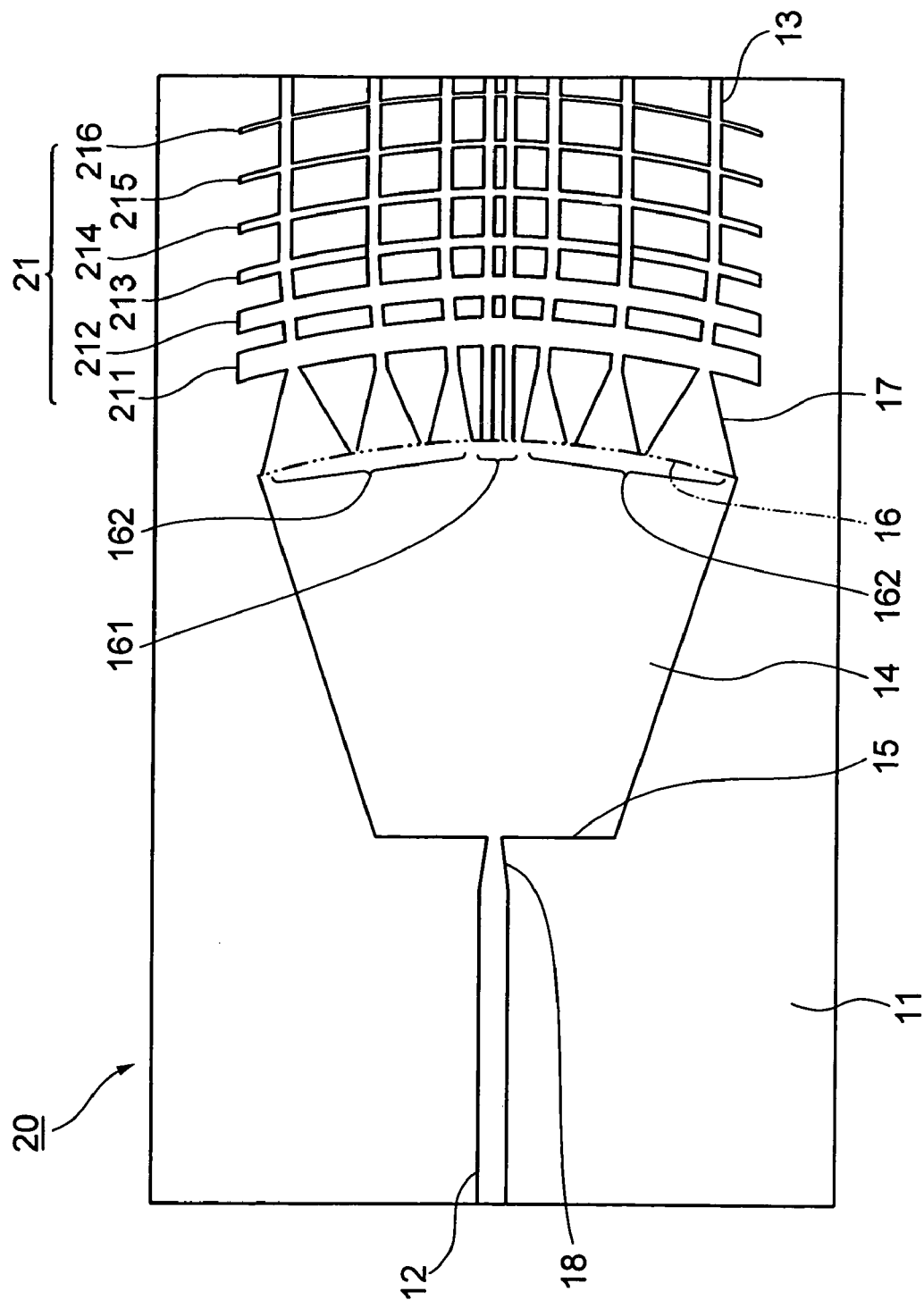
FIG. 7 is a plan view showing a fourth embodiment of a waveguide-type optical splitter according to the present invention.

FIG. 7 is a plan view showing the fourth embodiment of the waveguide-type optical splitter according to the present invention. Descriptions are provided below with reference to this drawing. However, regarding the same part as in the FIG. 3, explanations are omitted by denoting the same reference numeral.

The waveguides for output 13 shown in the FIG. 7 is provided with a function for reducing the transmission loss of the optical signal. In a joining point of the waveguide for output 13 and the tapered waveguide 17 which is a part of the waveguide for output 13 (hereinafter these waveguides are referred as a waveguide for output 13) and the slab waveguide 14, loss in power (hereinafter referred as "insertion loss") due to a scattering of light is generated. At this time, if a plurality of waveguides are crossed over a plurality of waveguides for output, the loss at the output end is reduced.

Consequently, the waveguides for output 13 shown in the FIG. 7 is arranged a plurality of waveguides for reducing loss 211 to 216. The waveguides for reducing loss 211 to 216 are formed on the substrate 11 at the same time as other waveguides and configures a transition region 21. Also, the waveguides for reducing loss 211 to 216 show themselves in a shape of an arc, the concentric circle of the output end 16, and become thinner with distance from the output end 16. The number of the waveguides for reducing loss 211 . . . is represented as six so as to illustrate clearly, however, in reality, it is considered preferable to be from twenty to forty. In the transition region 21, the plurality of waveguides from output 13 and the plurality of waveguides for reducing loss 211 to 216 are in a shape of a mesh. At this time, by gradually changing the widths and the spaces between the waveguides for reducing loss 211 to 216, the light propagating in the plurality of waveguides for output 13 is joined to the waveguide for output 13 with efficiently, thereby the insertion loss can be reduced.

In this embodiment, because the loss uniformization between the waveguides for output 13 is approached without providing the central part 161 of the output end 16 with the tapered waveguide 17, the light intensity in all the waveguides for output 13 tends to be low. Consequently, by arranging the waveguides for reducing loss 211 . . . , the light intensity in all the waveguides for output 13 can be increased.

Figure 8:
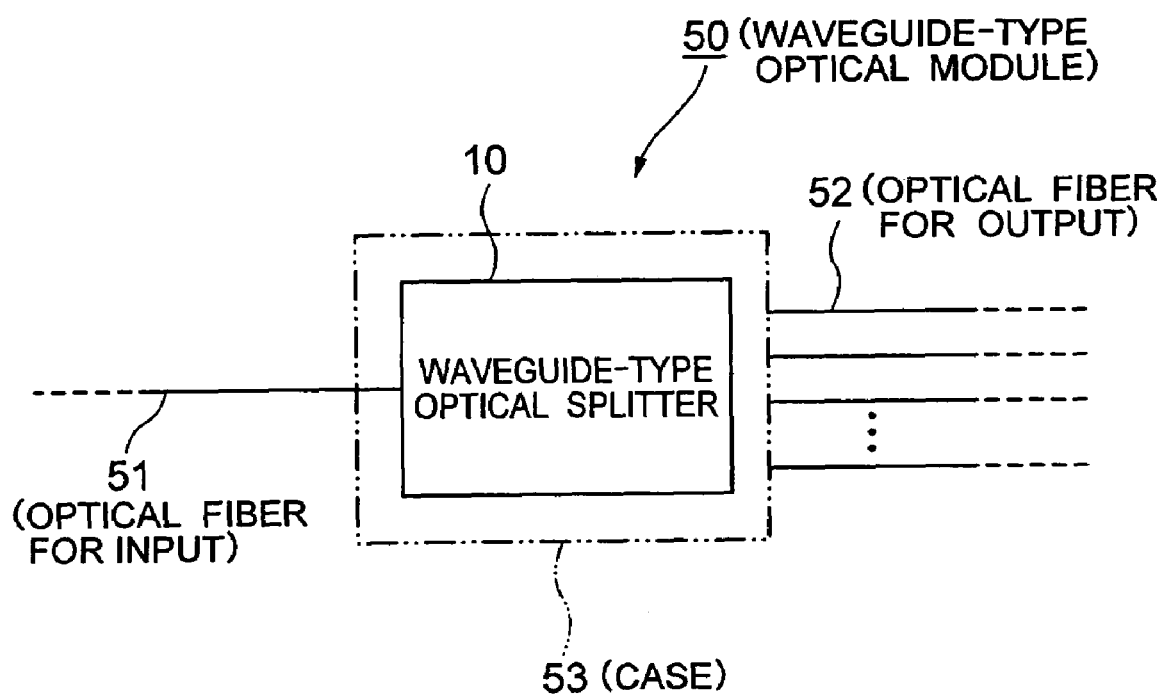
FIG. 8 is a schematic configuration view showing a first embodiment of a waveguide-type optical module according to the present invention.

FIG. 8 is a schematic configuration view showing a first embodiment of a waveguide-type optical module according to the present invention. Descriptions are provided below with reference to this drawing. However, regarding the same part as in the FIG. 3, explanations are omitted by denoting the same reference numeral.

A waveguide-type optical module 50 of this embodiment has the waveguide-type optical splitter 10 for branching off the optical signal shown in the FIG. 3 into plural and outputting, a fiber for input 51 for introducing the optical signal to the waveguide-type optical splitter 10, and a fiber for output 52 for transmitting the optical signal which has been branched off into plural in the waveguide-type optical splitter 10. The waveguide-type optical splitter 10 includes, as aforementioned, the waveguide for input 12 for introducing the optical signal, the slab waveguide 14 for branching off the optical signal introduced in the waveguide for input 12 by diffraction and propagating, and the plurality of waveguides for output 13 for outputting individually the plurality of optical signals which have been branched off inside the slab waveguide 14. Then, the waveguide for input 12 is configured such that an output end thereof is connected to the incident end 15 of the slab waveguide 14 and, at the connection point with the slab waveguide 14 of the waveguide for input 12, has a function for converting the spot size S of the optical signal on the incident end 15 of the slab waveguide 14.

According to the waveguide-type optical module 50, output light with small besides uniform can be obtained by disposing the waveguide-type optical splitter 10. Of course, the waveguide-type optical splitter 20 which is previously described may be used instead of the waveguide-type optical splitter 10.

Note that, in the FIG. 3 to the FIG. 7, a vertical direction (direction of a width in the waveguide) to a horizontal direction (lengthwise direction of the waveguide) is magnified in order to illustrate them easily understandable.

What is claimed is:

1. A waveguide-type optical splitter comprising:
   a waveguide for input for introducing an optical signal;
   a slab waveguide for branching off the optical signal introduced in the waveguide for input by diffraction and propagating; and
   a plurality of waveguides for output for outputting individually a plurality of optical signals which are branched off inside of the slab waveguide; wherein
   the waveguide for input is configured such that an output end thereof is connected to an incident end of the slab waveguide and has a function for converting a spot size of an optical signal on the incident end of the slab waveguide at a connection point with the slab waveguide, wherein a core layer of the waveguide at the connection point of the waveguide for input is narrowed as to have a convert function of the spot size.

2. The waveguide-type optical splitter, as claimed in claim 1, wherein the spot size of the optical signal on the incident end of the slab waveguide is expanded in a vicinity of the connection point, as a center, with the waveguide for input and the slab waveguide.

3. The waveguide-type optical splitter, as claimed in claim 1, wherein a transmission loss function for losing an optical signal of a higher mode included in a fundamental mode is contained in the waveguide for input.

4. The waveguide-type optical splitter, as claimed in claim 1, wherein the core layer of the waveguide at the connection point of the waveguide for input is narrowed in a tapered shape.

5. The waveguide-type optical splitter, as claimed in claim 1, wherein the core layer of the waveguide at the connection point of the waveguide for input is narrowed in a curved shape.

6. The waveguide-type optical splitter, as claimed in claim 1, wherein the waveguide for input has a unit waveguide for converting the spot size of the optical signal on the incident end of the slab waveguide at the connection point with the slab waveguide.

7. The waveguide-type optical splitter, as claimed in claim 6, wherein the unit waveguide is connected to the slab waveguide and an opening area of its connection end portion is reduced.

8. The waveguide-type optical splitter, as claimed in claim 6, wherein the waveguide for input has a transmission loss function for losing an optical signal of a higher mode included in a fundamental mode at a front stage of the unit waveguide.

9. The waveguide-type optical splitter, as claimed in claim 6, wherein the unit waveguide is narrowed in a tapered shape.

10. The waveguide-type optical splitter, as claimed in claim 6, wherein the unit waveguide is narrowed in a curved shape.

11. The waveguide-type optical splitter, as claimed in claim 7, wherein the opening area of the unit waveguide is reduced within a range of 10 percent to 90 percent.

12. The waveguide-type optical splitter, as claimed in claim 1, wherein the plurality of waveguides for output have a function for reducing a loss of an optical transmission.

13. A waveguide-type optical module comprising:
   a waveguide-type optical splitter for branching off an optical signal into plural and outputting;
   a fiber for input for introducing the optical signal to the waveguide-type optical splitter; and
   a fiber for output for transmitting the optical signal which is branched off into plural in the waveguide-type optical splitter; wherein
   the waveguide-type optical splitter includes a waveguide for input for introducing the optical signal, a slab waveguide for branching off the optical signal introduced in the waveguide for input by diffraction and propagating, and a plurality of waveguides for output for outputting individually a plurality of optical signals which are branched off inside of the slab waveguide, wherein the waveguide for input is configured such that an output end thereof is connected to an incident end of the slab waveguide and has a function for converting a spot size of the optical signal on the incident end of the slab waveguide at a connection point with the slab waveguide, wherein a core layer of the waveguide at the connection point of the waveguide for input is narrowed as to have a convert function of the spot size.

* * * * *